United States Patent
Lee et al.

(10) Patent No.: US 8,442,139 B2
(45) Date of Patent: May 14, 2013

(54) APPARATUS AND METHOD FOR TRANSMITTING AND RECEIVING IN A MULTI-ANTENNA SYSTEM

(75) Inventors: Joo-Hyun Lee, Suwon-si (KR); Jong-Ho Lee, Seoul (KR); Sung-Soo Hwang, Yongin-si (KR); Joon-Hyuk Kang, Seoul (KR); Won-Taek Song, Daejeon (KR); Kyung-Ho Park, Seoul (KR); Nam-Seok Chang, Suwon-si (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 758 days.

(21) Appl. No.: 12/543,896

(22) Filed: Aug. 19, 2009

(65) Prior Publication Data
US 2010/0046655 A1    Feb. 25, 2010

(30) Foreign Application Priority Data
Aug. 19, 2008   (KR) .................. 10-2008-0080753

(51) Int. Cl.
*H04B 7/02* (2006.01)
*H04L 1/02* (2006.01)

(52) U.S. Cl.
USPC ........... 375/267; 375/285; 375/299; 375/347; 375/349

(58) Field of Classification Search .......... 375/259–261, 375/267–269, 271, 279, 284, 285, 295, 299, 375/302, 308, 316, 329, 346, 347, 349
See application file for complete search history.

(56) References Cited

U.S. PATENT DOCUMENTS

| | | | |
|---|---|---|---|
| 6,185,258 B1 * | 2/2001 | Alamouti et al. | 375/260 |
| 2005/0185575 A1 * | 8/2005 | Hansen et al. | 370/208 |
| 2005/0286650 A1 * | 12/2005 | Han et al. | 375/267 |
| 2006/0039496 A1 * | 2/2006 | Chae et al. | 375/267 |
| 2006/0039499 A1 * | 2/2006 | Chae et al. | 375/299 |

* cited by examiner

*Primary Examiner* — David C. Payne
*Assistant Examiner* — James M Perez
(74) *Attorney, Agent, or Firm* — The Farrell Law Firm, P.C.

(57) ABSTRACT

Apparatuses and methods for transmitting and receiving in a multi-antenna system are provided. A receiver for reducing a quantization error of channel information feedback in a multi-antenna system includes a restore vector generator for selecting a codeword $c_k$ and d determining a real part $w_k^{real}$ and an imaginary part $w_k^{imag}$ of a restore vector corresponding to the codeword; and a post-processor for performing post-processing by multiplying the real part $w_k^{real}$ of the restore vector by a first reception signal and multiplying the imaginary part $w_k^{imag}$ of the restore vector by a second reception signal.

16 Claims, 4 Drawing Sheets

APPARATUS AND METHOD FOR TRANSMITTING AND RECEIVING IN A MULTI-ANTENNA SYSTEM

PRIORITY

This application claims priority under 35 U.S.C. §119(a) to a Korean patent application filed in the Korean Intellectual Property Office on Aug. 19, 2008 and assigned Serial No. 10-2008-0080753, the content of which is incorporated herein by reference.

BACKGROUND OF THE INVENTION

1. Field of the Invention

The present invention relates generally to apparatuses and methods for transmitting and receiving in a multi-antenna system, and more particularly, to a transmitter that precodes and then transmits a transmission signal on an n-th frame and a complex conjugate signal of the transmission signal on an (n+1)-th frame, and a receiver that divides a restore matrix for post-processing into a real part and an imaginary part, and then performs the post-processing.

2. Description of the Related Art

Using a plurality of transmission and reception antennas, a multi-antenna system can enhance channel capacity and transmission and reception performances without additional frequency assignment or increasing transmission power. The multi-antenna technology includes (1) a spatial diversity based scheme that obtains a diversity gain corresponding to a product of numbers of the transmission antennas and the reception antennas, and raises the transmission reliability using symbols passing through various channel paths by simultaneously transmitting the same data, (2) a spatial multiplexing scheme that raises the data rate by simultaneously transmitting multiple data symbols, and (3) a combination of the two schemes.

To separate the transmission signals of a plurality of user terminals in the multi-antenna system, a channel matrix estimated at a receiver of each individual user terminal is fed back to a transmitter of a base station. The transmitter of the base station precodes and transmits the signal using the fed back channel matrix of the user terminal. Because the feedback information is restricted by resource limitation of the uplink, the receiver feeds back an index of a codebook by mapping the channel matrix to feed back to an appropriate codeword using the codebook designed based on the channel matrix.

For example, in a 4×2 zero-forcing beamforming system using quantized channel information, each user terminal determines a reception beamforming weight we through a downlink channel matrix $H_k$, maps an effective channel $h_k^{e\!f\!f} = w_k H_k$ to one codeword of the codebook $C = \{c_1, c_2, \ldots, c_L\}$, and feeds back the index of the corresponding codeword. The base station selects users for the data transmission through scheduling and precodes with an inverse matrix of the matrix including the codewords fed back from the selected users $\{k_1, k_2, k_3, k_4\}$. The precoding matrix is given as shown in Equation (1).

$$P = \begin{bmatrix} c_{k_1}^T \\ c_{k_2}^T \\ c_{k_3}^T \\ c_{k_4}^T \end{bmatrix}^{-1} \quad (1)$$

In Equation (1), P denotes a preceding matrix, $c_{k_1}^T$ denotes a codeword of a user terminal $k_1$, $c_{k_2}^T$ denotes a codeword of a user terminal $k_2$, $c_{k_3}^T$ denotes a codeword of a user terminal $k_3$, $c_{k_4}^T$ denotes a codeword of a user terminal $k_4$, and $(\bullet)^T$ denotes a transposed matrix.

The preceding matrix P, which includes the quantization error, is subject to interference between the multiple user terminals.

When the codeword index of the pre-designed codebook is fed back based on the channel matrix estimated at the receiver and a Grassmannian codebook is used, the bit error is greater than 0.1 and an error floor value exhibiting no performance change, even when a Signal to Noise Ratio (SNR) increases, is considerable. When there is no limitation on the feedback, the receiver may quantize and feed back the elements of the channel matrix. Consequently, the error floor, which is about 0.02, is lower than when the Grassmannian codebook is used. However, to feed back each element of the channel matrix of the user terminal with certain bits, the feedback is considerable and the computations required for the quantization increase.

SUMMARY OF THE INVENTION

The present invention is designed to address at least the above-mentioned problems and/or disadvantages and to provide at least the advantages described below. Accordingly, an aspect of the present invention is to provide transmission and reception apparatuses and methods for rejecting interference between multiple user terminals by reducing a quantization error in a multi-antenna system.

Another aspect of the present invention is to provide transmission and reception apparatuses and methods for reducing computations required to select or quantize a codeword by lowering an error floor to an appropriate level, without feedback, in a multi-antenna system.

In accordance with an aspect of the present invention, a receiver for reducing a quantization error of channel information feedback in a multi-antenna system includes a restore vector generator for selecting a codeword $c_k$ for precoding and determining a real part $w_k^{real}$ and an imaginary part of a restore vector corresponding to the codeword; and a post-processor for performing a post-processing by multiplying the real part $w_k^{real}$ of the restore vector by a first reception signal and multiplying the imaginary part $w_k^{imag}$ of the restore vector by a second reception signal.

In accordance with another aspect of the present invention, a transmitter for reducing a quantization error of channel information feedback in a multi-antenna system includes a precoder for pre-processing a transmission signal by generating a precoding matrix; and a Radio Frequency (RF) processor for transmitting the precoded transmission signal via at least one antenna in a first time slot and transmitting a complex conjugate signal of the precoded transmission signal via at least one antenna in a second time slot.

In accordance with another aspect of the present invention, a method for reducing a quantization error of channel information feedback in a multi-antenna system includes selecting a codeword $c_k$ for preceding; determining a real part $w_k^{real}$ and an imaginary part of a restore vector corresponding to the codeword; performing a post-processing by multiplying the real part $w_k^{real}$ of the restore vector by a first reception signal; and multiplying the imaginary part $w_k^{imag}$ of the restore vector by a second reception signal.

In accordance with another aspect of the present invention, a method for reducing a quantization error of channel information feedback in a multi-antenna system includes pre-processing a transmission signal by generating a precoding matrix; transmitting the precoded transmission signal via at least one antenna in a first time slot; and transmitting a complex conjugate signal of the precoded transmission signal via at least one antenna in a second time slot.

In accordance with another aspect of the present invention, a receiver for reducing a quantization error of channel information feedback in a multi-antenna system includes an RF processor for receiving a transmission signal in a first time slot and receiving a complex conjugate signal of the transmission signal in a second time slot; a restore vector generator for selecting a codeword $c^k$ for precoding to postcode the transmission signal and determining a real part $w_k^{real}$ and an imaginary part of a restore vector corresponding to the codeword; and a post-processor for performing a post-processing by multiplying the real part $w_k^{real}$ of the restore vector by the transmission signal and multiplying the imaginary part $w_k^{imag}$ of the restore vector by the complex conjugate signal of the transmission signal.

In accordance with another aspect of the present invention, a method for reducing a quantization error of channel information feedback in a multi-antenna system includes receiving a transmission signal in a first time slot and receiving a complex conjugate signal of the transmission signal in a second time slot; selecting a codeword $c^k$ to postcode the transmission signal and determining a real part $w_k^{real}$ and an imaginary part of a restore vector corresponding to the codeword; and performing a post-processing by multiplying the real part $w_k^{real}$ of the restore vector by the transmission signal and multiplying the imaginary part $w_k^{imag}$ of the restore vector by the complex conjugate signal of the transmission signal.

BRIEF DESCRIPTION OF THE DRAWINGS

The above and other aspects, features, and advantages of the present invention will become more apparent from the following detailed description when taken in conjunction with the accompanying drawings, in which.

Throughout the drawings, like reference numerals will be understood to refer to like parts, components and structures.

DETAILED DESCRIPTION OF EMBODIMENTS OF THE INVENTION

The following description with reference to the accompanying drawings is provided to assist in a comprehensive understanding of certain embodiments of the present invention as defined by the claims and their equivalents. It includes various specific details to assist in that understanding, although these are to be regarded as merely exemplary. Accordingly, those of ordinary skill in the art will recognize that various changes and modifications of the embodiments described herein can be made without departing from the scope and spirit of the present invention. Also, descriptions of well-known functions and constructions are omitted for clarity and conciseness.

The various embodiments of the present invention provide transmitting and receiving apparatuses and methods for rejecting interference between multiple user terminals by reducing a quantization error in a multi-antenna system. Also, embodiments of the present invention provide the transmitting and receiving apparatuses and methods for reducing computations required to select or quantize a codeword by decreasing an error floor to an appropriate level without feedback in a multi-antenna system.

Figure 1:
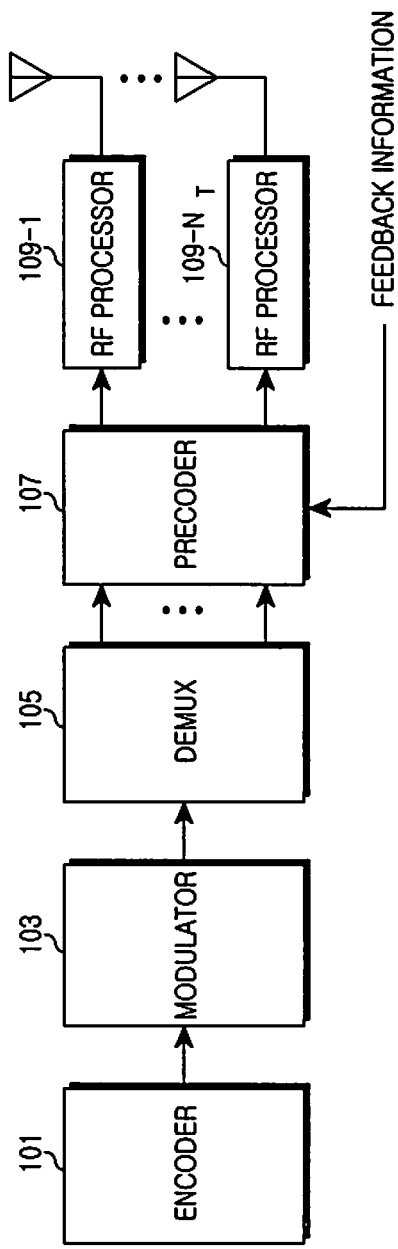
FIG. 1 illustrates a transmitter for reducing computations required to select or quantize a codeword by decreasing an error floor to an appropriate level without quantization error and feedback in a multi-antenna system according to an embodiment of the present invention.

FIG. 1 illustrates a transmitter for reducing computations required to select or quantize a codeword by decreasing an error floor to an appropriate level without quantization error and feedback in a multi-antenna system according to an embodiment of the present invention.

Referring to FIG. 1, the transmitter includes an encoder 101, a modulator 103, a demultiplexer (DEMUX) 105, a precoder 107, and Radio Frequency (RF) processors 109. The encoder 101 encodes transmission data at a corresponding modulation (e.g., Modulation and Coding Scheme (MCS)) level. The modulator 103 modulates the data encoded by the encoder 101 at the corresponding modulation level. The DEMUX 105 demultiplexes the modulation symbols output from the modulator 103 in the same number of transmission antennas and outputs a plurality of data streams.

The precoder 107 calculates a precoding matrix using feedback information, precodes and sends the transmission signal at a first time slot, and transmits a complex conjugate signal of the transmission signal at a second time slot. For example, when a feedback limitation is enforced, the precoder 107 acquires a preceding matrix by receiving a fed back index of a codeword corresponding to a channel matrix estimated from a plurality of receivers. Alternatively, without the feedback limitation, the precoder 107 can receive the channel matrix fed back from the receivers and acquire the precoding matrix using a Singular Value Decomposition (SVD).

In various embodiments, the precoder 107 may perform the precoding by allocating preset codewords to receivers, without receiving the channel matrix or the index of the codeword fed back from the receivers. As for the codeword, a reference value of the rows is 1 and the rows are orthogonal to each other. The rows of one codeword are orthogonal to those of another codeword.

By sending the transmission signal at the first time slot and the sending the complex conjugate signal of the transmission signal at the second time slot, it is possible to remove unnecessary signals generated when the receiver calculates a restore vector by dividing to a real part and an imaginary part.

The RF processors 109-1 through 109-$N_T$ convert the data stream output from the precoder 107 to an analog signal. Next, the RF processors 109-1 through 109-$N_T$ convert the analog signal to an RF signal in order to actually transmit and send the RF signal over corresponding antennas.

Figure 2:
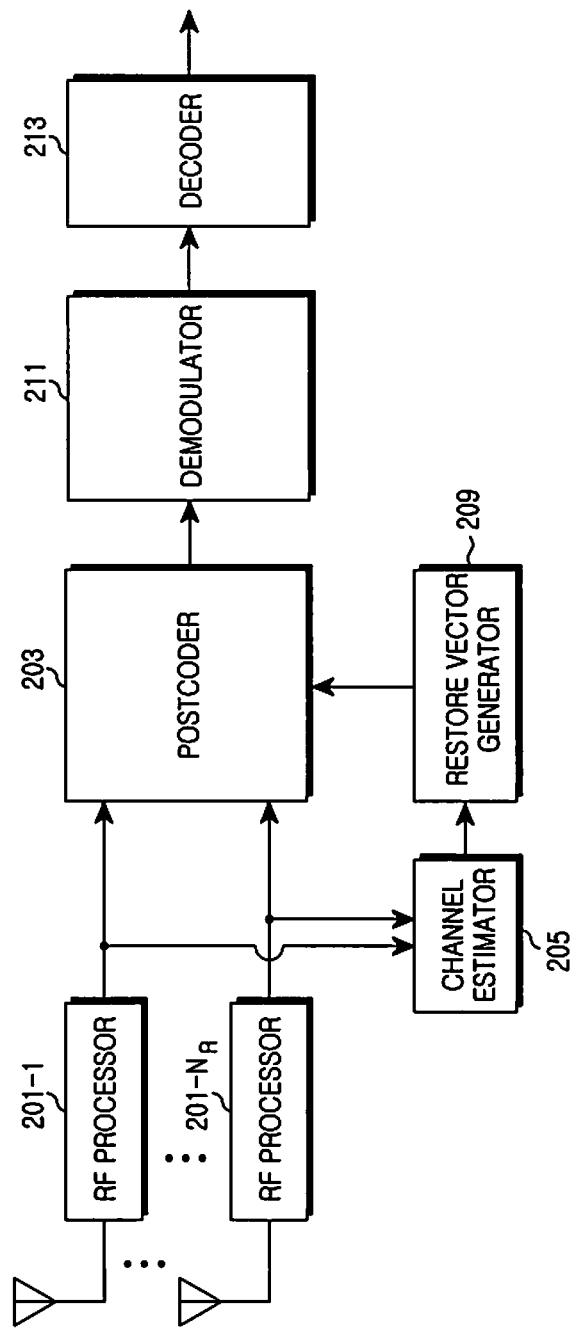
FIG. 2 illustrates a receiver for reducing quantization error in a multi-antenna system according to an embodiment of the present invention.

FIG. 2 illustrates a receiver for reducing quantization error in a multi-antenna system according to an embodiment of the present invention.

Referring to FIG. 2 the receiver includes RF processors 201-1 through 201-NR, a postcoder 203, a channel estimator 205, a restore vector generator 209, a demodulator 211, and a decoder 213. The RF processors 201-1 through 201-NR convert the RF signal received via respective antennas to a baseband signal. The received signal includes a signal carried by data subcarriers and a signal carried by pilot subcarriers.

The channel estimator 205 estimates the channel to the transmitter using the pilot of the signal output from the RF processors 201-1 through 201-NR. The estimated channel is formed as a channel matrix and fed back to the transmitter. Alternatively, the codebook corresponding to the channel matrix can be searched and the codebook index can be fed back.

The restore vector generator 209 calculates the restore vector or the restore matrix we based on the relation of the channel matrix output from the channel estimator 205 and the codeword corresponding to the codeword index fed back in order to reduce the quantization error in relation to the effective channel.

The reception signal of $k_1$-th user terminal can be expressed as shown in Equation (2):

$$y_{k_1} = H_{k_1} Ps + n_k, \qquad (2)$$

where $y_{k_1}$ denotes a reception vector of a $k_1$-th user terminal, P denotes a preceding matrix, s denotes a transmission vector, and $n_k$ denotes a noise vector.

By defining the restore vector we as shown in Equation (3), the quantization error can be overcome.

$$w_{k_1} H_{k_1} = c_{k_1} \qquad (3)$$

In Equation (3), $w_k$ is a restore vector of a $k_1$-th user terminal, $H_k$ is a channel matrix of the $k_1$-th user terminal, and $c_{k_1}$ is a codeword of the $k_1$-th user terminal.

However, when a number of reception antennas is smaller than a number of transmission antennas, as in the 4×2 Multiple-Input Multiple-Output (MIMO) system, there is no general linear solution of the restore vector that meets Equation (3). Accordingly, instead of the linear solution, the an embodiment of the present invention provides a method for restoring a channel matrix with a codeword by calculating and combining two restore vectors using a real part and an imaginary part divided.

To acquire a restore vector of a real part, $\mathrm{Re}\{w_{k_1}^{real} H_{k_1}\} = \mathrm{Re}\{c_{k_1}^T\}$ is assumed. $\mathrm{Re}\{c_{k_1}^T\}$ is given by Equation (4).

$$2\mathrm{Re}\{c_{k_1}^T\} = c_{k_1}^T + (c_{k_1}^T)^{conj} \qquad (4)$$

$$= \mathrm{Re}\{w_{k_1}^{real} H_{k_1}\} + \mathrm{Re}\{(w_{k_1}^{real})^{conj}(H_{k_1})^{conj}\}$$

$$= [w_{k_1}^{real} (w_{k_1}^{real})^{conj}] \begin{bmatrix} H_{k_1} \\ (H_{k_1})^{conj} \end{bmatrix}$$

In Equation (4), real denotes a real number and conj denotes a conjugate.

Equation (4) can be re-expressed as shown in Equation (5):

$$w_{k_1}^{real} = \left( 2\mathrm{Re}\{c_{k_1}^H\} \begin{bmatrix} H_{k_1} \\ (H_{k_1})^{conj} \end{bmatrix}^{-1} \right)_{1:2}, \qquad (5)$$

where $(\ )_{1:2}$ in the right side selects only the first and second left elements of the vector in the round brackets.

Likewise, to calculate a restore matrix of an imaginary part, $\mathrm{Im}\{w_{k_1}^{imag} H_{k_1}\} = \mathrm{Im}\{c_{k_1}^T\}$ is assumed. $\mathrm{Im}\{c_{k_1}^T\}$ is given by Equation (6).

$$2j\mathrm{Im}\{c_{k_1}^T\} = c_{k_1}^T - (c_{k_1}^T)^{conj} \qquad (6)$$

$$= \mathrm{Im}\{w_{k_1}^{imag} H_{k_1}\} - \mathrm{Im}\{(w_{k_1}^{imag})^{conj}(H_{k_1})^{conj}\}$$

$$= [w_{k_1}^{imag} (w_{k_1}^{imag})^{conj}] \begin{bmatrix} H_{k_1} \\ (H_{k_1})^{conj} \end{bmatrix}$$

In Equation (6), real denotes a real number and conj denotes a conjugate.

Equation (6) can also be re-expressed as shown in Equation (7).

$$w_{k_1}^{imag} = \left( 2j\mathrm{Im}\{c_{k_1}^T\} \begin{bmatrix} H_{k_1} \\ (H_{k_1})^{conj} \end{bmatrix}^{-1} \right)_{1:2} \qquad (7)$$

By combining the restore vectors acquired from Equation (5) and Equation (7), the channel matrix can be restored with the codeword as shown in Equation (8).

$$c_{k_1} = \mathrm{Re}\{w_{k_1} H_{k_1}\} + j\mathrm{Im}\{w_{k_1}^{imag} H_{k_1}\} \qquad (8)$$

The postcoder 203 performs the post-processing by multiplying $w_{k_1}^{real}$ and $w_{k_1}^{imag}$ output from the restore vector generator 203 by the reception signal.

As for the post-processing, the precoded transmission signal is divided to the real part and the imaginary part using Equation (8) and the restore vectors. The real part and the imaginary part are $x_{Re}$ and $x_{Im}$.

The reception signal can be expressed as Equation (9):

$$y_{k_1} = H_{k_1}(x^{real} + jx^{imag}) + n_k, \qquad (9)$$

where $y_{k_1}$ denotes a reception vector of a $k_1$-th user terminal, $H_{k_1}$ denotes a channel matrix of the $k_1$-th user terminal, the transmission signal is a sum of a real transmission signal $x^{real}$ and an imaginary transmission signal $x^{imag}$, and $n_k$ denotes a noise vector.

The product of the restore matrixes $w_{k_1}^{real}$ and $w_{k_1}^{imag}$ by the reception signal $y_{k_1}$ is divided into the real part and the imaginary part based on Equation (10).

$$\mathrm{Re}\{w_{k_1}^{real} y_{k_1}\} = \mathrm{Re}\{w_{k_1}^{real} H_{k_1}\} x^{real} - \mathrm{Im}\{w_{k_1}^{real} H_{k_1}\} x^{imag} + \mathrm{Re}\{w_{k_1}^{real} n_{k_1}\}$$

$$\mathrm{Im}\{w_{k_1}^{real} y_{k_1}\} = \mathrm{Im}\{w_{k_1}^{real} H_{k_1}\} x^{real} + \mathrm{Re}\{w_{k_1}^{real} H_{k_1}\} x^{imag} + \mathrm{Im}\{w_{k_1}^{real} n_{k_1}\}$$

$$\mathrm{Re}\{w_{k_1}^{imag} y_{k_1}\} = \mathrm{Re}\{w_{k_1}^{imag} H_{k_1}\} x^{real} - \mathrm{Im}\{w_{k_1}^{imag} H_{k_1}\} x^{imag} + \mathrm{Re}\{w_{k_1}^{imag} n_{k_1}\}$$

$$\mathrm{Im}\{w_{k_1}^{imag} y_{k_1}\} = \mathrm{Im}\{w_{k_1}^{imag} H_{k_1}\} x^{real} + \mathrm{Re}\{w_{k_1}^{imag} H_{k_1}\} x^{imag} + \mathrm{Im}\{w_{k_1}^{real} n_{k_1}\} \qquad (10)$$

In Equation (10), $\mathrm{Re}\{w_{k_1}^{real} y_{k_1}\}$ denotes the real part of a signal produced by multiplying a reception signal $y_{k_1}$ by a restore vector $w_{k_1}^{real}$ of the real part, and $\mathrm{Im}\{w_{k_1}^{real} y_{k_1}\}$ denotes the imaginary part of the signal produced by multiplying the reception signal $y_{k_1}$ by the restore vector $w_k^{real}$ of the real part. Similarly, $\mathrm{Re}\{w_{k_1}^{imag} y_{k_1}\}$ denotes the real part of the signal produced by multiplying the reception signal $y_{k_1}$ by the restore vector $w_{k_1}^{imag}$ of the imaginary part, and $\mathrm{Im}\{_{k_1}^{imag} y_{k_1}\}$ denotes the imaginary part of the signal produced by multiplying the reception signal $y_{k_1}$ by the restore vector $w_{k_1}^{real}$ of the real part.

In Equation (10), the underlined terms are required for data detection and the other terms are to be removed. Accordingly, as the transmitter sends the precoded transmission signal at the first time slot and the complex conjugate of the precoded transmission signal at the second time slot, the reception signal is given by Equation (11).

$$y_{k_1} = H_{k_1}(x^{real} + jx^{imag}) + n_{k_1}$$
$$y_{k_1}^{conj} = H_{k_1}(x^{real} - jx^{imag}) + \tilde{n}_{k_1} \quad (11)$$

To remove the underlined terms from Equation (10), the postcoder 203 processes the reception signal based on Equation (12).

$$\text{Re}\{w_{k_1}^{real} y_{k_1}\} + \text{Re}\{w_{k_1}^{real} y_{k_1}^{conj}\} + \quad (12)$$
$$j\text{Im}\{w_{k_1}^{imag} y_{k_1}\} + j\text{Im}\{w_{k_1}^{imag} y_{k_1}^{conj}\} + j\text{Im}\{w_{k_1}^{imag} y_{k_1}\} -$$
$$j\text{Im}\{w_{k_1}^{imag} y_{k_1}^{conj}\} + \text{Re}\{w_{k_1}^{imag} y_{k_1}\} - \text{Re}\{w_{k_1}^{imag} y_{k_1}^{conj}\} =$$
$$2(\text{Re}\{w_{k_1}^{real} H_{k_1}\} + j\text{Im}\{w_{k_1}^{imag} H_{k_1}\})x + \text{noise} = 2c_{k_1}^T Ps + \text{noise}$$

In Equation (12), $c_{k_1}^T$ denotes the codeword of the $k_1$-th user terminal, P denotes the precoding matrix of the $k_1$-th user terminal, and s denotes the transmission signal.

As described above, the multi-user interference in the channel quantization can be rejected. Next, the codeword of the codebook selected for the user feeds back is considered. Because the restored vector is multiplied by the noise component in Equation (10), the noise power can be minimized by using a codeword that minimizes a norm of the restore vector with respect to the corresponding codeword.

As described above, the postcoder 203 feeds back the index of the codeword corresponding to the channel matrix. However, when there is no feedback, i.e., when the transmitter allocates a random codeword, the restore vector can be acquired from the relation of the estimated channel matrix and the corresponding codeword allocated by the transmitter based on Equation (4) through Equation (8).

The demodulator 211 demodulates the signal output from the postcoder 203 at the corresponding modulation (MCS) level. The decoder 213 detects the original data by decoding the signal output from the demodulator 213 at the corresponding modulation level.

The performance degradation caused by the quantization error can be overcome in a zero-forcing beamforming system using a conventional channel information quantization. Disadvantageously, the suggested method, using the two time slots, lowers a total sum rate by half. However, the conventional method suffers from the interference between the multiple users caused by the quantization error. Therefore, when a Signal to Noise Ratio (SNR) increases, its sum rate does not increase greatly. By contrast, a suggested method in accordance with an embodiment of the present invention completely rejects interference between the multiple users caused by the quantization error in the high SNR, and considerably improves the performance even when the sum rate is reduced by half.

Figure 3:
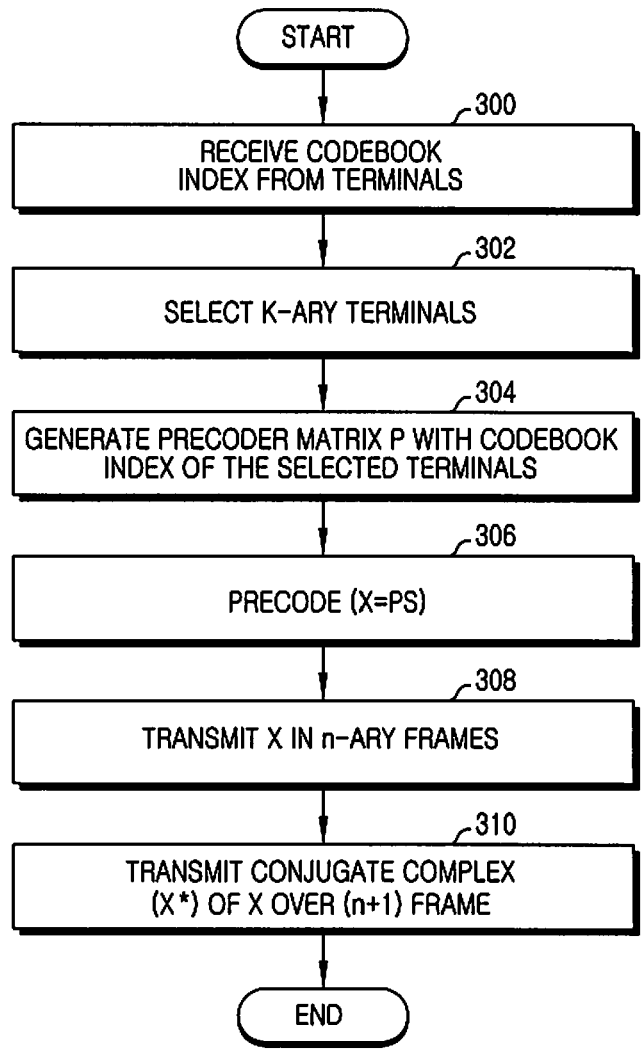
FIG. 3 illustrates operations of a transmitter for reducing computations required to select or quantize a codeword by decreasing an error floor to an appropriate level without quantization error and feedback in an multi-antenna system according to an embodiment of the present invention.

FIG. 3 illustrates a flowchart outlining operations of a transmitter for reducing computations required to select or quantize a codeword by decreasing an error floor to an appropriate level without quantization error and feedback in a multi-antenna system according to an embodiment of the present invention.

Referring to FIG. 3, a transmitter receives codebook indexes from a plurality of the terminals in step 300, and selects k-ary terminals from among the plurality of terminals in step 302.

The transmitter generates a precoder matrix P using a codebook index of the selected terminals in step 304, and performs precoding in step 306.

In step 308, the transmitter transmits the precoded transmission signal in a first time slot and in step 310, transmits a complex conjugate signal of the precoded transmission signal in a second time slot. This removes the unnecessary signaling, when the receiver calculates and divides the restore vector to the imaginary part and the real part.

Figure 4:
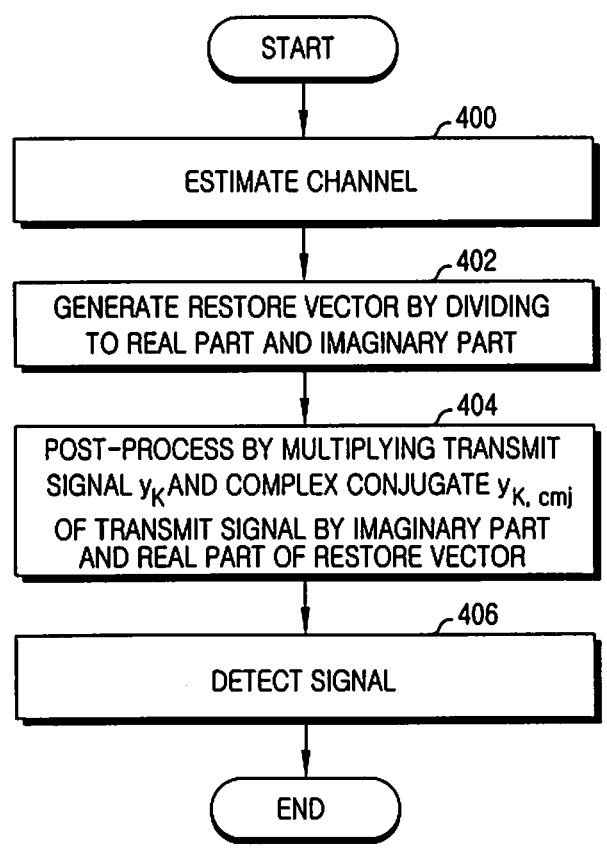
FIG. 4 illustrates operations of a receiver for reducing computations required to select or quantize a codeword by decreasing an error floor to an appropriate level without quantization error and feedback in a multi-antenna system according to an embodiment of the present invention.

FIG. 4 illustrates a flowchart outlining operations of a receiver for reducing computations required to select or quantize a codeword by decreasing an error floor to an appropriate level without quantization error and feedback in a multi-antenna system according to an embodiment of the present invention.

Referring to FIG. 4, in step 400, a receiver estimates a channel based on a pilot signal or a reference signal, and in step 404, calculates a restore vector based on a relation of a channel matrix and a matrix corresponding to an index of a fed back codeword. Consequently, a restore vector is divided to a real part and an imaginary part. That is, the restore vector is acquired from the relation of Equation (4) through Equation (8). When a random codeword is assigned from the transmitter without the feedback, the restore vector is acquired from the relation of the channel matrix and the allocated codeword.

In step 404, the receiver performs post-processing by multiplying the transmission signal and the complex conjugate signal of the transmission signal by an imaginary restore vector and a real restore vector respectively. The post-processing is performed using Equation (12).

In step 406, the receiver detects the signal through the post-processing.

As described above, by dividing the restore matrix to separate the signal into the real part and the imaginary part and combining the two restore matrixes in the multi-antenna system, the interference between the multiple users caused by the quantization error can be cancelled. In particular, in a multi-antenna system in which the number of the transmission antennas is greater than the number of the reception antennas, the interference between the multiple users in the quantization error of the channel information can be completely removed. Further, the computations required to select or quantize the codeword can be reduced by lowering the error floor to the appropriate level without the feedback in the multi-antenna system.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A receiver for reducing a quantization error of channel information feedback in a multi-antenna system, comprising:
   a channel estimator for estimating a channel between a transmitter and the receiver, and forming a channel matrix;
   a restore vector generator for selecting a codeword $c_k$ for precoding and determining a real part $w_k^{real}$ and an imaginary part $w_k^{imag}$ of a restore vector based on the channel matrix and the selected codeword $c_k$; and
   a post-processor for receiving a first reception signal and a second reception signal, performing post-processing by multiplying the real part $w_k^{real}$ of the restore vector by the first reception signal and multiplying the imaginary part $w_k^{imag}$ of the restore vector by the second reception signal.

2. The receiver of claim 1, wherein the second reception signal comprises a complex conjugate signal of the first reception signal.

3. The receiver of claim 1, wherein the first reception signal is received in a first time slot and the second reception signal is received in a second time slot.

4. The receiver of claim 1, wherein the selected codeword $c_k$ minimizes a norm of the restore vector with respect to the selected codeword $c_k$.

5. A transmitter for reducing a quantization error of channel information feedback in a multi-antenna system, comprising:
- a precoder for pre-coding a transmission signal using a precoding matrix; and
- a Radio Frequency (RF) processor for transmitting the precoded transmission signal via at least one antenna in a first time slot and transmitting a complex conjugate signal of the precoded transmission signal via at least one antenna in a second time slot,
- wherein the precoded transmission signal and the complex conjugate signal are transmitted via a same antenna,
- wherein the precoding matrix comprises codewords indicating codeword indices fed back from a plurality of terminals, and
- wherein each of the codewords minimizes a norm of a restore vector with respect to a respective codeword.

6. The transmitter of claim 5, wherein the restore vector includes a real part $w_k^{real}$ and an imaginary part $w_k^{imag}$, which is based on a channel matrix and a selected codeword $c_k$, and
- wherein the channel matrix is formed by an estimated channel.

7. A method for reducing a quantization error of channel information feedback in a multi-antenna system, comprising:
- estimating a channel between a transmitter and a receiver, and forming a channel matrix;
- selecting, by a restore vector generator, a codeword $c_k$ for precoding;
- determining, by the restore vector generator, a real part $w_k^{real}$ and an imaginary part $w_k^{imag}$ of a restore vector based on the channel matrix and the selected codeword;
- receiving a first reception signal and a second reception signal; and
- performing, by a post-processor, post-processing by multiplying the real part $w_k^{real}$ of the restore vector by the first reception signal, and multiplying the imaginary part $w_k^{imag}$ of the restore vector by the second reception signal.

8. The method of claim 7, wherein the second reception signal includes a complex conjugate signal of the first reception signal.

9. The method of claim 7, wherein the first reception signal is received in a first time slot and the second reception signal is received in a second time slot.

10. The method of claim 7, wherein the selected codeword minimizes a norm of the restore vector with respect to the selected codeword.

11. A method for reducing a quantization error of channel information feedback in a multi-antenna system, comprising:
- pre-coding, by a precoder, a transmission signal using a precoding matrix; and
- transmitting, by a Radio Frequency (RF) processor, the precoded transmission signal via at least one antenna in a first time slot; and
- transmitting, by the RF processor, a complex conjugate signal of the precoded transmission signal via at least one antenna in a second time slot,
- wherein the precoded transmission signal and the complex conjugate signal are transmitted via a same antenna,
- wherein the precoding matrix includes codewords indicating codeword indices fed back from a plurality of terminals, and wherein each of the codewords minimizes a norm of the restore vector with respect to a respective codeword.

12. The method of claim 11, wherein the restore vector includes a real part $w_k^{real}$ and an imaginary part $w_k^{imag}$, which is based on a channel matrix and a selected codeword $c_k$, and
- wherein the channel matrix is formed by an estimated channel.

13. A receiver for reducing a quantization error of channel information feedback in a multi-antenna system, comprising:
- a Radio Frequency (RF) processor for receiving a transmission signal in a first time slot and receiving a complex conjugate signal of the transmission signal in a second time slot;
- a channel estimator for estimating a channel between a transmitter and the receiver, and forming a channel matrix;
- a restore vector generator for selecting a codeword $c_k$ to postcode the transmission signal and determining a real part $w_k^{real}$ and an imaginary part $w_k^{imag}$ of a restore vector to based on the channel matrix and the selected codeword $c_k$; and
- a post-processor for performing a post-processing by multiplying the real part $w_k^{real}$ of the restore vector by the transmission signal and multiplying the imaginary part $w_k^{imag}$ of the restore vector by the complex conjugate signal of the transmission signal.

14. The receiver of claim 13, wherein the selected codeword $c_k$ minimizes a norm of the restore vector with respect to the codeword $c_k$.

15. A method for reducing a quantization error of channel information feedback in a multi-antenna system, comprising:
- receiving, by a Radio Frequency (RF) processor, a transmission signal in a first time slot;
- receiving, by the RF processor, a complex conjugate signal of the transmission signal in a second time slot;
- estimating a channel between a transmitter and a receiver, and forming a channel matrix;
- selecting, by a restore vector generator, a codeword $c_k$ to postcode the transmission signal;
- determining, by the restore vector generator, a real part $w_k^{real}$ and an imaginary part $w_k^{imag}$ of a restore vector based on the channel matrix and the codeword $c_k$; and
- performing, by a post-processor, post-processing by multiplying the real part $w_k^{real}$ of the restore vector by the transmission signal and multiplying the imaginary part $w_k^{imag}$ of the restore vector by the complex conjugate signal of the transmission signal.

16. The method of claim 15, wherein the codeword $c_k$ minimizes a norm of the restore vector with respect to the codeword $c_k$.

* * * * *